United States Patent [19]
Wilson et al.

[11] Patent Number: 5,191,961
[45] Date of Patent: Mar. 9, 1993

[54] BOWL-FEED APPARATUS

[75] Inventors: Colin D. Wilson, Largs; Alexander F. MacGregor, Renfrew; Alistair J. McKillop, Gourock, all of Scotland

[73] Assignee: International Business Machines Corp., Armonk, N.Y.

[21] Appl. No.: 498,074

[22] Filed: Mar. 23, 1990

[30] Foreign Application Priority Data

Mar. 31, 1989 [GB] United Kingdom ............ 8907327.4

[51] Int. Cl.$^5$ .............................................. B65G 29/00
[52] U.S. Cl. .................................... 198/392; 198/380; 406/87
[58] Field of Search ........................ 198/380, 392, 391; 406/86, 87, 88

[56] References Cited

U.S. PATENT DOCUMENTS

| | | | |
|---|---|---|---|
| 2,904,162 | 9/1959 | Simer | 198/380 |
| 3,012,651 | 12/1961 | Hawkes | 198/380 |
| 3,143,201 | 8/1964 | Wyle et al. | 198/391 X |
| 3,684,129 | 8/1972 | Loy et al. | 221/167 |
| 4,007,854 | 2/1977 | Ervine | 198/392 X |
| 4,093,062 | 6/1978 | Sjogren | 198/380 |
| 4,709,798 | 12/1987 | Herzog | 198/392 X |
| 4,825,995 | 5/1989 | Nalbach | 198/380 |

FOREIGN PATENT DOCUMENTS 365152 5/1981 Australia .
2509273 1/1983 France .

Primary Examiner—Joseph E. Valenza
Assistant Examiner—Keith L. Dixon
Attorney, Agent, or Firm—L. R. Letson

[57] ABSTRACT

A part feed bowl is provided with removable bowl tooling to allow the same bowl to be fitted to feed varying parts from time to time. The bowl tooling is an air feed and has the capability of variable feed speeds thereby improving efficiency.

9 Claims, 7 Drawing Sheets

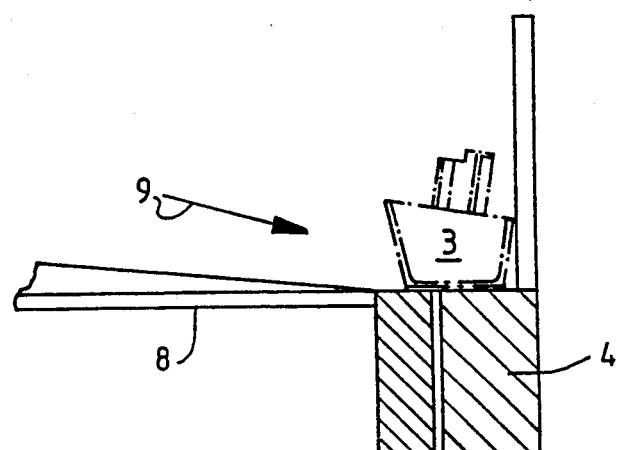
FIG. 3
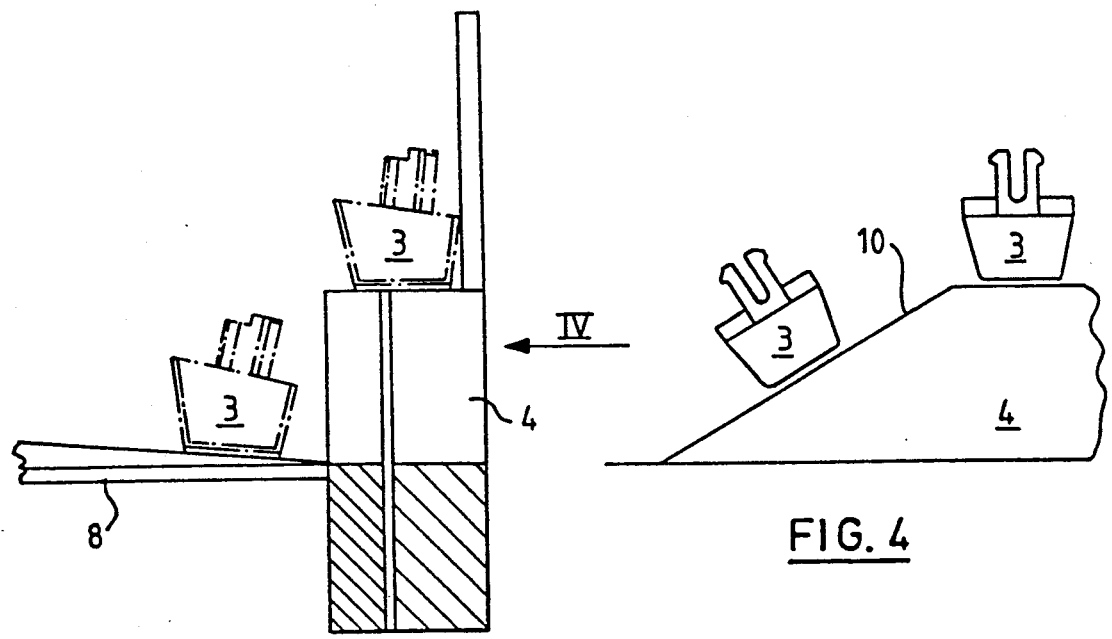
FIG. 4
FIG. 5

BOWL-FEED APPARATUS

This invention relates to apparatus for supplying workpieces to automated machinery.

At the present time, the efficient operation of assembly lines often necessitates the use of a mechanism for feeding workpieces at a controlled rate and in a desired orientation to machinery. Rotary bowl-feed devices are commonly employed to perform this function. Workpieces are supplied to a feedtrack within the bowl, and are passed through the internal bowl "tooling" which orientates and segregates them prior to their arrival at the machine.

The reliability of bowl feeders, however, is questionable. They are prone to jamming, the problem mainly stemming from the drive mechanism used to feed the workpieces along the track and through the tooling. Traditionally this has been a vibratory motion, bouncing the workpieces along in a sinusoidal wave motion. The effective feeding of workpieces is entirely dependent on the correct frequency of vibration being used to match the bowl tooling. The bowl feeder needs to be "tuned" to the correct rate of feed, and this can prove difficult.

An alternative method of drive for the workpieces is centrifugal force, which propels workpieces around the outside of the bowl feeder. The speed that the workpieces pass through the orientation tooling needs to be controlled; if too fast, they do not get the chance to orientate properly and, if too slow, there results a dramatic fall in the feed rate to the machinery. Again the feeding mechanism needs tuning and this, as for the previous mechanism described, requires a high degree of skill.

The present invention seeks to improve the efficiency of feeders by providing a drive mechanism that allows the workpiece feed speed to be adjusted within the feeding mechanism. It differs significantly from existing drive systems in that instead of the bowl moving to generate either a vibratory or centrifugal motion, a gas flow, controlled at several points around the track, is used to propel the workpieces. The use of this variable drive system in conjunction with optionally removable bowl tooling, allows the same bowl to be used to orientate different workpieces. The greater degree of control provided by this invention facilitates fine-tuning of the drive mechanism for different workpieces and tooling, thus reducing the risk of workpieces jamming within the feeder, and allowing it to operate at an optimum rate.

According to the invention, a bowl-feed apparatus is provided for supplying workpieces in a desired orientation comprising a central reservoir into which the workpieces are initially loaded in a random orientation, and surrounded by a feedtrack including tooling for orientating the workpieces around the periphery of the bowl along which the workpieces travel, different segments of the feedtrack causing misorientated workpieces to fall back into the reservoir, and is characterized in a gas flow for propelling workpieces along the feedtrack and including means for controlling the gas flow conditions in each of the feedtrack segments to allow the flow conditions along the track to be adjusted.

A specific example of the invention will now be described with the aid of the accompanying drawings in which:

FIGS. 3 to 13 are side views of the various segments of the track illustrating their different functions.

In this particular embodiment, the workpiece feed is achieved by compressed air escaping through slots in a feedtrack. The feedtrack itself is mounted in segments to a bowl base ring and compressed air fed into each one, thus allowing the air pressure to be adjusted in each track segment. In this way a considerable increase in control is given over conventional feed systems in that the workpieces' linear speed can be varied at each segment to aid segregation at the tooling stages and to accelerate workpieces out of the feeder bowl when they are in their final orientated state. The feed rate for different workpieces can also be adjusted by altering the air pressure to suit the difference in workpiece mass.

Figure 1:
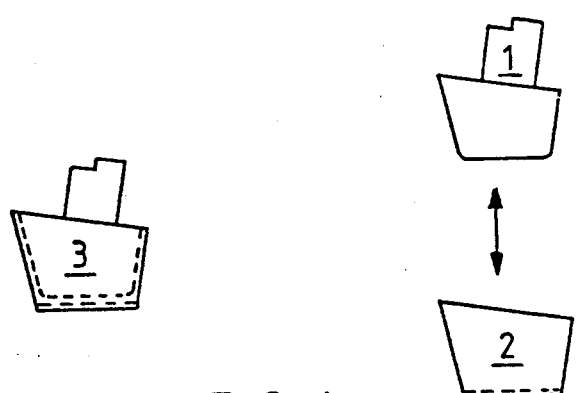
FIG. 1 shows the structure of a capped button assembly.

In this specific embodiment, the workpiece to be orientated is a keyboard button assembly and consists of a button stem 1 and cap 2 as illustrated in FIG. 1. The final desired orientation of the assembly 3 can be seen in this figure, its natural rest state being on one of its flat surfaces.

Figure 2A:
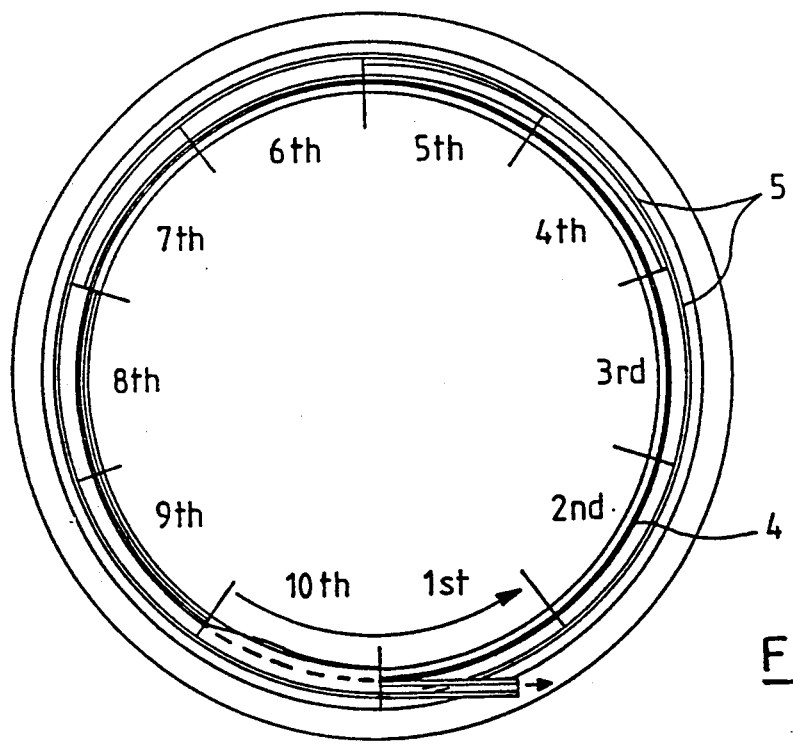
FIGS. 2A and 2B show plan and side views of the bowl construction.
Figure 2B:
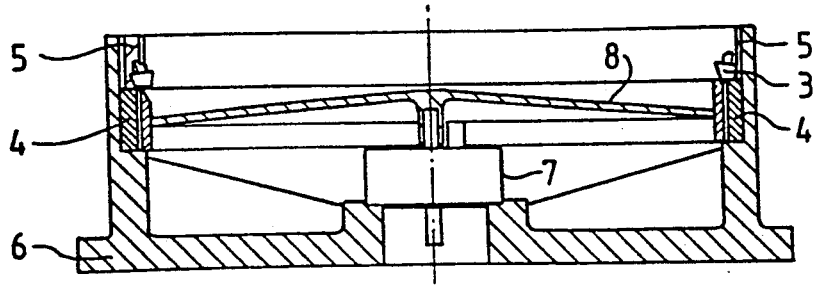

The bowl construction can be seen in FIGS. 2A and 2B, in plan view and from the side. The plan view shows the feedtrack 4 on the inner perimeter of the bowl and highlights the segmented nature of the track (in this example it is divided into ten segments), as well as illustrating the change in the nature of the tooling 5 with distance along the track. The tooling is constructed on a removable ring, and can be changed depending on the workpiece being supplied to the bowl. The bowl itself is constructed on a machined cast aluminum base ring 6 onto which a D.C. servo motor 7 is mounted. This drives a rotating disc at a speed of approximately 15 RPM in the direction indicated by the arrow, which in turn feeds workpieces to the outer perimeter of the disc.

The first section of the track 4 is flush with the edge of the disc so that the workpieces 3 can fall from the disc onto the horizontal, flat portion of the track at this point (FIG. 3). This motion is aided by a radial airjet 9. The workpieces are propelled along the track 4 by an air flow and, as shown in FIG. 4 which is a view in the direction of the arrow IV in FIG. 5, up an air feed ramp 10 to a higher track level, the second segment, which prevents interference of these workpieces with those still on the disc 8. It has been found that the feeder operates more efficiently with controlled quantities of workpieces being fed to it at any one time, and this can easily be achieved by employing a commercially available hopper feed system to supply workpieces into the bowl. The hopper feedrate is controlled by sensors which detect the quantity of workpieces in the bowl and "tops this up" as required to maintain bowl throughput.

Figure 6:
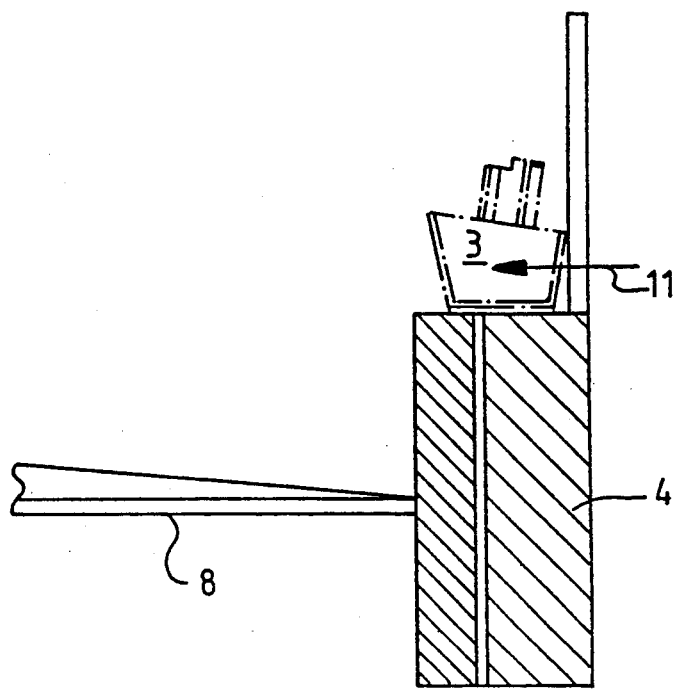
Figure 7:
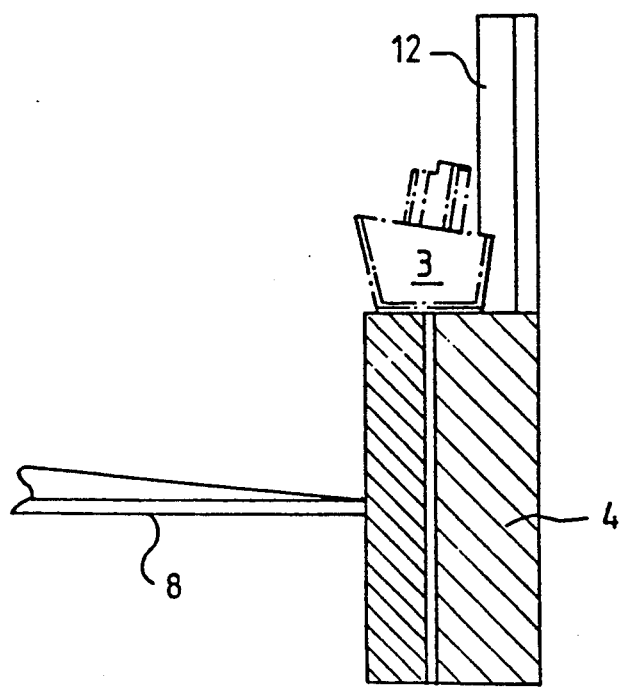
Figure 8:
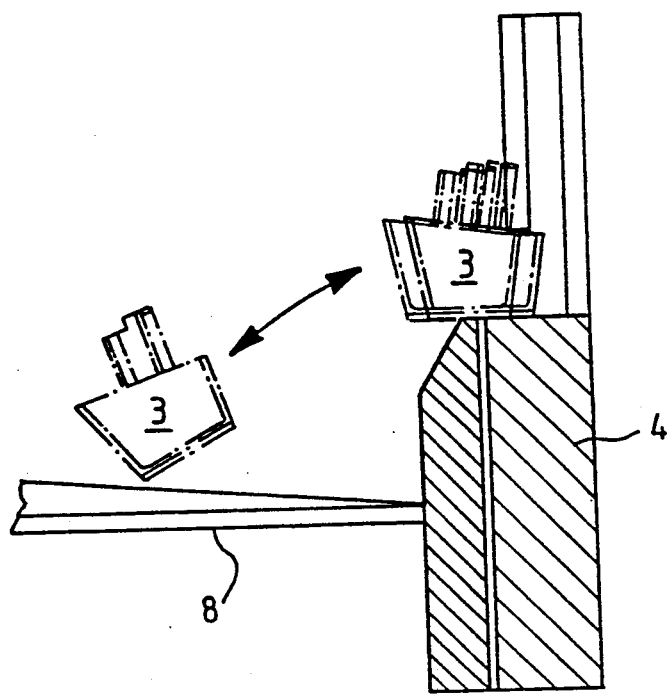

Once the workpieces are on the feedtrack 4, they are conveyed along it at a velocity sufficient for centrifugal force to hold the workpiece against the bowl tooling 5 for segregation and orientation, but with the air pressure restricted so that the workpieces do not lift off the air track 4. If centrifugal force is insufficient, the top of the feedtrack 4 and/or the air supply slots can be angled so as to keep the workpieces against the inner wall of the bowl. As can be seen in FIG. 6, an air jet 11 is associated with the third track section and blows workpieces off the track when it is full. The tooling 12 in the fourth segment effectively constrains the back edge of the assemblies 3. In the fifth segment (FIG. 8) the track inner edge is removed so that the center of gravity of the assembly 3 over hangs the edge of the track. If the assembly is misorientated, that is its back is not contained by the tooling, then it falls back into the bowl.

Figure 9:
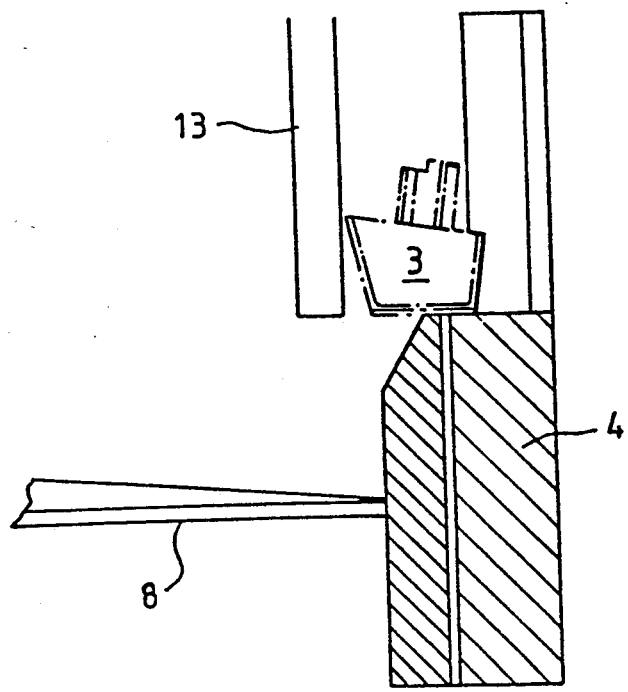
Figure 10:
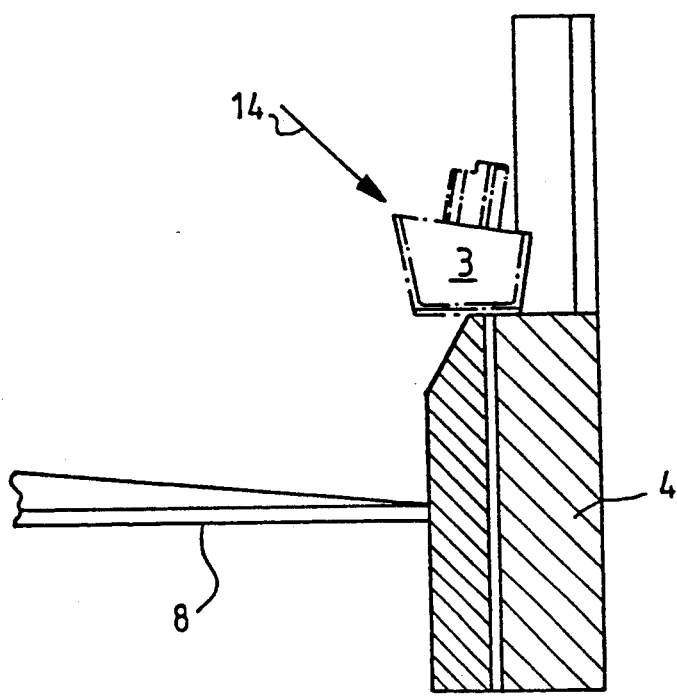
Figure 11:
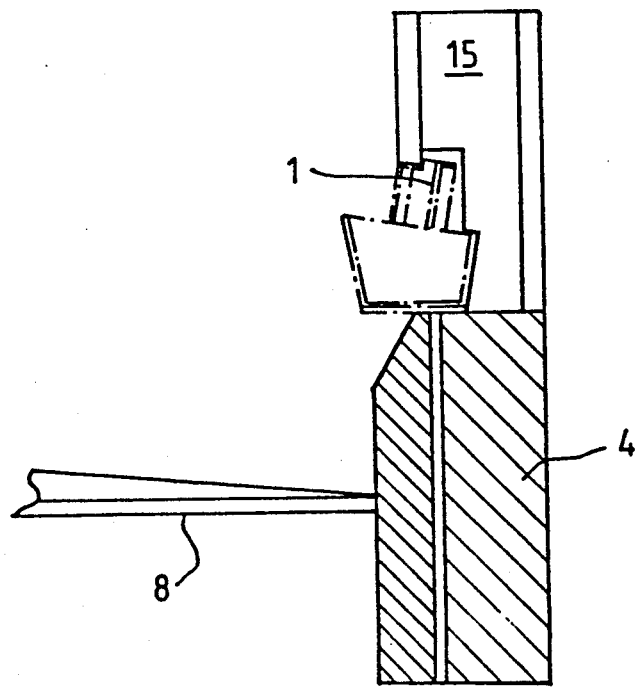
Figure 12:
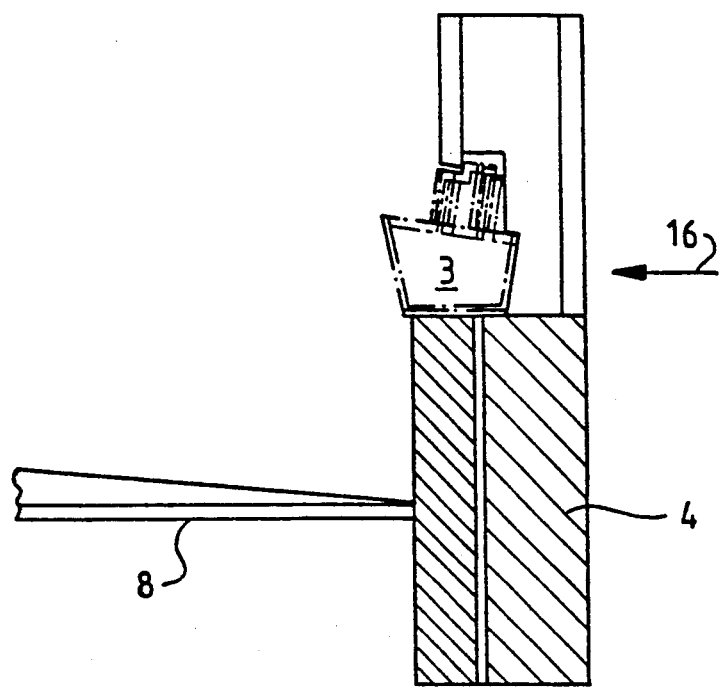
Figure 13:
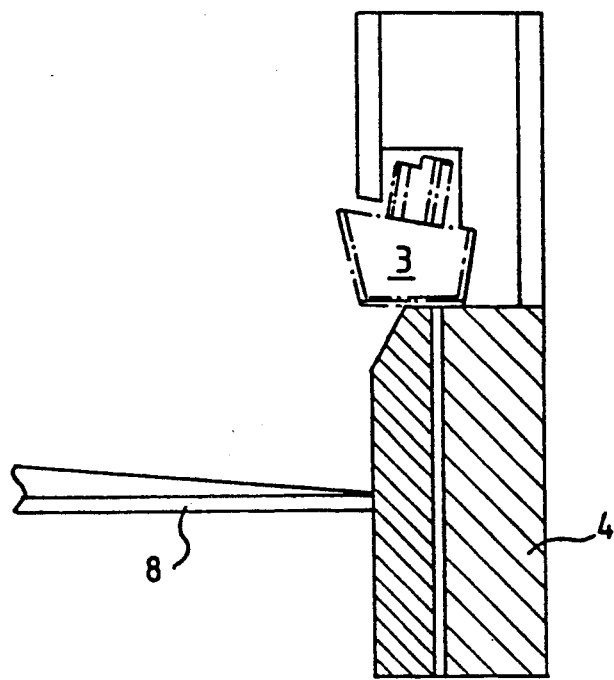

Correctly orientated assemblies pass through a soft seating device 13 in the sixth segment, FIG. 9, and in the seventh segment, FIG. 10, are further urged into the correct position by an air jet 14 at an angle to the track. In the eighth segment, FIG. 11, the tooling 15 contains the stem 1 of the assembly and in the ninth segment, FIG. 12, another air jet 16 directed towards the bowl center, ejects any assemblies where the cap stems and buttons have been separated. Final containment of the assembly occurs in the tenth segment prior to the end of the track where the assemblies exit the bowl perimeter and interface with other workpiece handling devices (FIG. 13). The button is then inverted by tooling which is external to that of the bowl feeder.

Figure 14:
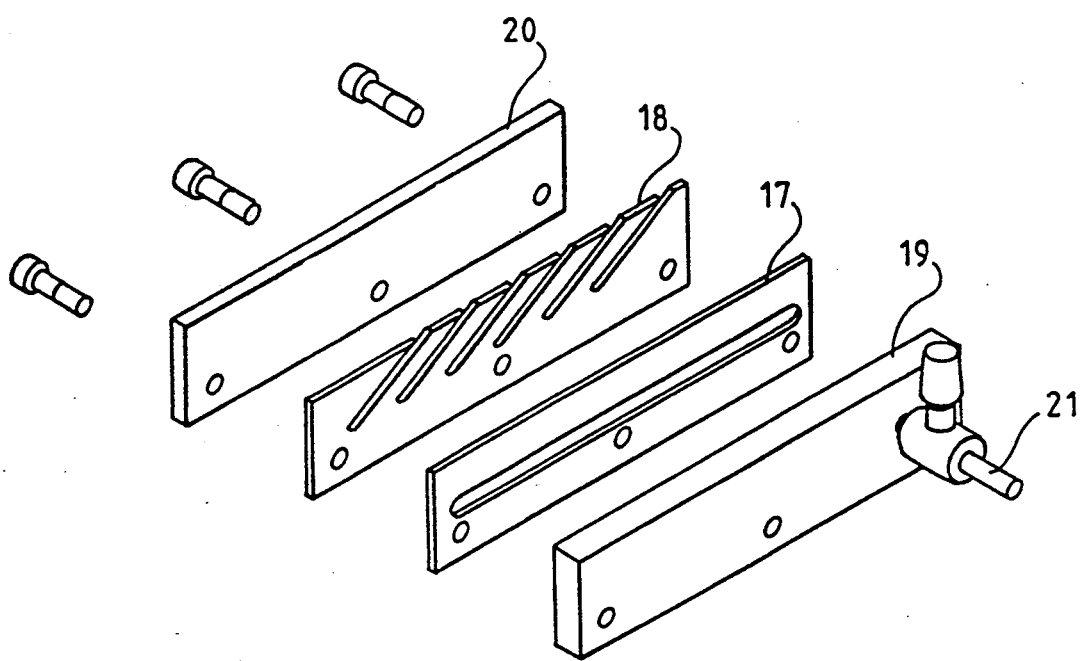
FIG. 14 is an exploded diagram showing the detailed construction of a section of the feedtrack.

The preferred feedtrack design is shown in FIG. 14 and illustrates a "sandwich" construction in which two strips, 17 and 18, of Mylar plastics material (each 0.4 mm thick), are clamped between two metal plates (19 and 20). The top surfaces of these plates then form the track surface. Air is fed through the base plate 19 through an air inlet and regulator 21 from an air supply chamber, not shown, beneath the track. One of the strips 18 has angled slots (approximately 1 mm wide), preferably from 30° to 40° to horizontal. These are pitched at 10 mm centres and provide multiple airjets from the air supply chamber to the feedtrack surface. The slot in the strip 17 acts as an inlet manifold. The airjets then carry the workpieces around the bowl for segregation and orientation. The air pressure can be altered in each of the feedtrack segments and, in this way, fine control of the workpiece velocity is possible, thus greatly reducing the difficulties involved in "tuning" of the feeder and reducing the occurrence of workpieces jamming. It should be noted that the curvature of the parts 17 to 20 is not shown to simplify the drawing.

Although the transport of a capped keybutton assembly has been described in this example, it would be clear to one skilled in the art that employing the principles highlighted, the same bowl could be tooled and the flow conditions modified to feed a multitude of workpieces which are currently fed by conventional systems. Indeed, the feedtrack need not be constructed of arc segments, but could be linear and segmented. The optimum flow conditions in each track segment for a particular workpiece and its associated tooling, would be constant and thus once known, would reduce the operator skill required to tune the bowl. Indeed in a fully automatic system, the manifold in the strip 17 and/or the slot in strip 18, can be constructed to provide the exact airflow for the particular segment and workpiece.

In operation the feedrate for complex shaped workpieces is approximately 200 parts per minute, whereas for simple workpieces it rises to the order of 2000 per minute, which is equal to or greater than existing drive mechanisms. The bowl diameter is dependent on workpiece size, but for the majority of applications would usually be between 0.25 m to 1.0 m.

A feed system employing the principles described will greatly increase the reliability of automated machinery, the output of which has previously been diminished by the poor methods of feeding workpieces to the machine. By having a completely controllable and, once known for a particular workpiece and tooling, constant feed rate, stoppages due to workpieces jamming in the feeder will be greatly reduced, thus yielding significant improvement in machine productivity.

The versatility of the bowl feeder described is greatly enhanced by employing the removable tooling 45 which allows the same bowl to be used for different workpieces. However, the other advantages of the invention can be retained if the tooling 5 is not removable, in which case the bowl-feeder could only be used for a particularly shaped workpiece. Operator-interchangeable tooling has not been possible before because of the particularly difficult tooling requirements of prior art bowl-feeders.

We claim:

1. A bowl-feed apparatus for supplying workpieces 3 in a desired orientation comprising a central reservoir into which the workpieces 3 are initially loaded in a random orientation, and surrounded by a feedtrack 4 for orientating the workpieces 3 around the periphery of the bowl along which the workpieces 3 travel, different segments of the feedtrack 4 causing misorientated workpieces 3 to fall back into the reservoir, and is characterized in a gas flow emanating from said feedtrack for propelling workpieces 3 along the feedtrack 4 and including means 17, 18, 21 for controlling the gas flow conditions in each of the feedtrack segments to allow the flow conditions along the track 4 to be adjusted.

2. Apparatus as claimed in claim 1 in which the means for controlling the gas flow along the feedtrack consists of a series of gas inlets 21, one for each feedtrack segment, each associated with a regulator such that the gas pressure within each segment can be varied, the gas being fed from the inlets 21 onto the feedtrack 4 through slots angled to propel workpieces in the desired direction.

3. Apparatus as claimed in claim 2 including a rotatable disc 8 within the bowl onto which the workpieces 3 are initially supplied, with one segment of the feedtrack 44 flush with its outer edge such that on rotation of the disc workpieces are urged onto the feedtrack 4 at this segment.

4. Apparatus as claimed in claim 3 in which a DC servo motor 7 is used to drive the disc 8 rotation.

5. Apparatus as claimed in claim 2, wherein gas jets 9, 11, 14, 16 are used to urge workpieces 3 onto, and orientate them while on, the feedtrack 4.

6. Apparatus as claimed in claim 3, in which the feedtrack 4 is constructed of two strips of plastics material 17, 18, sandwiched between two metal plates 19, 20.

7. Apparatus as claimed in claim 3, in which a hopper is used to supply the workpieces 3 to the reservoir at a controlled rate.

8. Apparatus as claimed in claim 3, where the gas is air.

9. Apparatus as claimed in claim 3 in which the feedtrack 4 is removable located in the bowl to allow the insertion of different tooling 5 for different workpieces 3.

* * * * *